(12) United States Patent
Chen et al.

(10) Patent No.: US 11,274,226 B2
(45) Date of Patent: Mar. 15, 2022

(54) FLUOROPOLYMER SOLUTION FOR FORMING A FLUOROPOLYMER COATING

(71) Applicant: THE CHEMOURS COMPANY FC, LLC, Wilmington, DE (US)

(72) Inventors: Xudong Chen, Hockessin, DE (US); Timothy Edward Hopkins, Newark, DE (US); Robert Clayton Wheland, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 16/073,894

(22) PCT Filed: Jan. 30, 2017

(86) PCT No.: PCT/US2017/015593
§ 371 (c)(1),
(2) Date: Jul. 30, 2018

(87) PCT Pub. No.: WO2017/136266
PCT Pub. Date: Aug. 10, 2017

(65) Prior Publication Data
US 2019/0040274 A1 Feb. 7, 2019

Related U.S. Application Data

(60) Provisional application No. 62/291,994, filed on Feb. 5, 2016.

(51) Int. Cl.
*C09D 127/12* (2006.01)
*C09D 129/10* (2006.01)
*C09D 7/20* (2018.01)
*C08F 214/18* (2006.01)
*C08F 230/08* (2006.01)

(52) U.S. Cl.
CPC ........ *C09D 127/12* (2013.01); *C08F 214/188* (2013.01); *C09D 7/20* (2018.01); *C09D 129/10* (2013.01); *C08F 230/08* (2013.01); *C08F 2800/20* (2013.01)

(58) Field of Classification Search
None
See application file for complete search history.

(56) References Cited

U.S. PATENT DOCUMENTS

| | | | |
|---|---|---|---|
| 4,701,508 A | 10/1987 | Homma et al. | |
| 4,751,114 A * | 6/1988 | Homma | C08F 214/188 427/386 |
| 4,886,862 A | 12/1989 | Kuwamura et al. | |
| 5,043,393 A | 8/1991 | Homma et al. | |
| 5,179,181 A | 1/1993 | Homma et al. | |
| 5,962,612 A | 10/1999 | Takakura et al. | |
| 2006/0004129 A1* | 1/2006 | Otozawa | C08G 65/007 524/284 |
| 2010/0324224 A1* | 12/2010 | Tanaka | C08F 8/30 525/293 |
| 2011/0253951 A1* | 10/2011 | Yoshida | C08F 220/22 252/589 |
| 2017/0114242 A1 | 4/2017 | Lloyd et al. | |

FOREIGN PATENT DOCUMENTS

| | | |
|---|---|---|
| CN | 102911314 A | 6/2013 |
| EP | 0 185 526 A2 | 6/1986 |
| EP | 0 430 628 A1 | 6/1991 |
| EP | 1 095 938 A1 | 5/2001 |
| JP | S61272273 A | 12/1986 |
| JP | H4-202485 A | 7/1992 |

OTHER PUBLICATIONS

International Search Report and Written Opinion dated Mar. 30, 2017, Authorized Officer Bruno Gatinet.

* cited by examiner

*Primary Examiner* — Shamim Ahmed
*Assistant Examiner* — Bradford M Gates

(57) ABSTRACT

The present disclosure relates to solutions for forming a fluoropolymer coatings, comprising: i) an organic solvent, and dissolved therein ii) a fluoropolymer comprising repeat units arising from specific fluoroolefin, alkyl or aryl vinyl ether and alkenyl silane monomers. The present fluoropolymer solutions have long shelf stability life, minimal to no formation of insoluble residue or gel over the period between their manufacture and use, are of a viscosity that allows for facile filtration and so are substantially free from undesirable submicron size particles, have a dissolved polymer content such that the solutions are of utility in commercial single-coat coating processes, and afford fluoropolymer coatings on substrates that have excellent adhesion to the substrate during use and over the lifetime of the electronic device.

14 Claims, No Drawings

FLUOROPOLYMER SOLUTION FOR FORMING A FLUOROPOLYMER COATING

CROSS-REFERENCES TO RELATED APPLICATIONS

This application claims the benefit of U.S. provisional patent application No. 62/291,994, filed Feb. 5, 2016, which is incorporated by reference herein in its entirety.

FIELD OF THE DISCLOSURE

The present disclosure is directed toward a fluoropolymer solution for forming a fluoropolymer coating, comprising an organic solvent and dissolved fluoropolymer. The fluoropolymer is a copolymer containing repeating units arising from the polymerization of a fluoroolefin, an alkyl or aryl vinyl ether and an alkenyl silane.

BACKGROUND OF DISCLOSURE

Polymer coatings are used in a wide variety of commercial devices for a wide variety of utilities, for example as electrical insulation and to protect the device from damage by physical and chemical means. For these reasons polymer coatings are used as passivation layers in microcircuit electronic devices. The utility of these polymers is greatly increased if the polymers are photoimageable, i.e., photocrosslinkable to form polymer patterns with defined small dimensions, so as to provide a three dimensional framework for the interconnection of multiple electronic components, circuits and layers. As electronic device features trend smaller, move to higher frequencies and have lower power consumptions, conventionally used polymers such as polyimides have not been able to meet the new and stringent demands, for example, for lower dielectric constants, lower loss tangents and lower moisture absorption.

Fluoropolymer coatings offer many desirable properties, as fluorinated polymers afford coatings with excellent resistance to a broad array of chemicals, and have high thermal stability and flame resistance, while maintaining processing options and mechanical properties in use. Of particular utility to the electronics and communications industry is that fluorinated polymers afford coatings having low dielectric constant, high volume/surface resistivity, and high dielectric breakdown voltage.

For a variety of reasons including ease of manufacture and low cost, polymer coatings are often formed on a substrate by coating the substrate with a solution of polymer. The solvent is a carrier that is removed following coating, leaving the deposited polymer coating that can be further processed.

Industry imposes a variety of demands on polymer solutions used for forming polymer coatings. Such polymer solutions are needed to have a long shelf stability life. It is highly desirable that such solutions are immune to formation of insoluble residue or gel over the period between their manufacture and use, including shipping and storage, normally at ambient conditions, however often with excursions to temperatures well outside of ambient. The electronics industry imposes additional demands on such polymer solutions. Polymer solutions for use in the manufacture of electronic devices often must be substantially free from small particles (e.g., submicron size) that if deposited on the surface of the device would cause device errors. As such, these polymer solutions must be of a viscosity that allows for quick and easy filtration through submicron filters for the removal of such particles, while at the same time having a (dissolved) polymer content such that the solutions are of utility in commercial single-coat coating processes. Higher molecular weight polymers are generally preferred from the perspective of electrical applications and mechanical properties, as such generally result in coatings that are better bonded to substrates and form superior films. However, the higher the molecular weight, normally the lower the solubility and higher the viscosity of a polymer solution. If a polymer solution is too viscous, then filtration can be commercially impossible, and one may not be able to make the desired thickness or homogeneity of coating. Additionally, the polymer coatings must have excellent adhesion to the substrate during use and over the lifetime of the electronic device such that the coating does not bubble, peel or flake off, undesirably exposing the substrate.

There is a continuing need by the electronics and related industries for fluoropolymer solutions meeting these critical requirements, and from which can be afforded high performance fluoropolymer coatings on substrates.

SUMMARY OF THE DISCLOSURE

This disclosure relates to solutions for forming fluoropolymer coatings. Some of the above deficiencies and other problems related to fluoropolymer solutions for use in preparing fluoropolymer coatings on substrates are reduced or eliminated by the present fluoropolymer solutions. The present fluoropolymer solutions have long shelf stability life, minimal to no formation of insoluble residue or gel over the period between their manufacture and use, are of a viscosity that allows for facile filtration and so are substantially free from undesirable small particles (e.g., submicron size), have a (dissolved) polymer content such that the solutions are of utility in commercial single-coat coating processes, and afford fluoropolymer coatings on substrates that have excellent adhesion to the substrate during use and over the lifetime of the electronic device.

Disclosed herein are solutions for forming a fluoropolymer coating comprising: i) an organic solvent, and dissolved therein ii) a fluoropolymer comprising repeat units arising from monomers: (a) fluoroolefin selected from the group consisting of tetrafluoroethylene, chlorotrifluoroethylene, hexafluoropropylene and perfluoro(methyl vinyl ether); (b) alkyl vinyl ether wherein the alkyl group is a C1 to C6 straight chain saturated hydrocarbon radical or a C3 to C6 branched chain or cyclic saturated hydrocarbon radical, or aryl vinyl ether wherein the aryl group is unsubstituted or substituted; and (c) alkenyl silane of the formula $SiR_1R_2R_3R_4$, wherein $R_1$ is an ethylenically unsaturated hydrocarbon radical, $R_2$ is aryl, aryl substituted hydrocarbon radical, branched C3-C6 alkoxy radical, or substituted or unsubstituted cyclic C5-C6 alkoxy radical, and $R_3$ and $R_4$ are independently selected from linear or branched C1-C6 alkoxy radical, or substituted or unsubstituted cyclic C5-C6 alkoxy radical.

Also discloses herein are processes for forming a fluoropolymer coating on a substrate, comprising: (I) applying a coating of a solution onto at least a portion of a substrate, wherein said solution comprises: i) an organic solvent, and dissolved therein ii) a fluoropolymer comprising repeat units arising from monomers: (a) fluoroolefin selected from the group consisting of tetrafluoroethylene, chlorotrifluoroethylene, hexafluoropropylene and perfluoro(methyl vinyl ether); (b) alkyl vinyl ether wherein the alkyl group is a C1 to C6 straight chain saturated hydrocarbon radical or a C3 to C6 branched chain or cyclic saturated hydrocarbon radical, or aryl vinyl ether wherein the aryl group is unsubstituted or substituted; and (c) alkenyl silane of the formula SiR1R2R3R4, wherein R1 is an ethylenically unsaturated hydrocarbon radical, R2 is aryl, aryl substituted hydrocarbon radical, branched C3-C6 alkoxy radical, or substituted or unsubstituted cyclic C5-C6 alkoxy radicals, and R3 and R4 are independently selected from linear or branched C1-C6 alkoxy radicals, or substituted or unsubstituted cyclic C5-C6 alkoxy radicals; (II) removing at least a portion of said organic solvent from the coated solution, and optionally (III) curing said fluoropolymer thereby forming said fluoropolymer coating.

DETAILED DESCRIPTION

The features and advantages of the present disclosure will be more readily understood by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

In one embodiment the present invention is a solution for forming a fluoropolymer coating. The solution comprises i) an organic solvent, and dissolved therein ii) a fluoropolymer comprising repeat units arising from monomers: (a) fluoroolefin selected from the group consisting of tetrafluoroethylene, chlorotrifluoroethylene, hexafluoropropylene and perfluoro(methyl vinyl ether) and; (b) alkyl vinyl ether wherein the alkyl group is a C1 to C6 straight chain saturated hydrocarbon radical or a C3 to C6 branched chain or cyclic saturated hydrocarbon radical, or aryl vinyl ether wherein the aryl group is unsubstituted or substituted; and (c) alkenyl silane of the formula SiR1R2R3R4, wherein R1 is an ethylenically unsaturated hydrocarbon radical, R2 is aryl, aryl substituted hydrocarbon radical, branched C3-C6 alkoxy radical, or substituted or unsubstituted cyclic C5-C6 alkoxy radicals, and R3 and R4 are independently selected from linear or branched C1-C6 alkoxy radicals, or substituted or unsubstituted cyclic C5-C6 alkoxy radicals.

In accordance with some embodiments, the solution contains 0.5 to 35 weight percent dissolved fluoropolymer and 65 to 99.5 weight percent organic solvent, based on the combined weight of organic solvent and fluoropolymer. In another embodiment, for example where thin coatings (for example, a 50 nm thick coating on a substrate from a one-coat application of such solution), the solution contains 0.5 to 5 weight percent dissolved fluoropolymer and 95 to 99.5 weight percent organic solvent, based on the combined weight of organic solvent and fluoropolymer. In one embodiment the solution comprises 2 weight percent dissolved fluoropolymer and 98 weight percent organic solvent. In accordance with some embodiments, the solution contains 5 to 35 weight percent dissolved fluoropolymer and 65 to 95 weight percent organic solvent, based on the combined weight of organic solvent and fluoropolymer. In another embodiment the solution comprises 15 to 25 weight percent dissolved fluoropolymer and 80 to 85 weight percent organic solvent. In another embodiment the solution comprises 20 weight percent dissolved fluoropolymer and 80 weight percent organic solvent.

The concentration of fluoropolymer in organic solvent within these ranges can be adjusted to allow for an appropriate coating of the solution to be formed on a substrate by a chosen coating method.

The fluoropolymer is dissolved in the organic solvent to form the present solution. By dissolved is meant that the fluoropolymer is in solution in the organic solvent, and no solid or gel fluoropolymer visible to the naked eye remains suspended in the organic solvent. The solution is formed by conventional methodology in conventional apparatus. For example, organic solvent can be added to a stirred vessel and then fluoropolymer added to reach the desired weight percent content. The mixture can be stirred, optionally while heating, until the fluoropolymer is dissolved in the organic solvent.

In accordance with some embodiments, the fluoropolymer solution is filtered under pressure through a micron or submicron (e.g., 0.4 to 1 or 1.5 micron) pore size cartridge filter. In one embodiment, this results in removal of particles from the solution that are greater than 0.4 microns in longest feature size, recognizing that some small amount of particles greater than 0.4 microns and less than 1 micron may pass through the filter. In one embodiment the solution is substantially free of particles of size greater than 1 micron.

In one embodiment the solution has a phase stable shelf-life. This means that the fluoropolymer remains in solution following formation and does not form gel or solids with the passage of time and throughout shipping and storage of the solution at ambient conditions, even until and during the use of the solution to form a fluoropolymer coating. In one embodiment the solution has a phase stable shelf-life such that the fluoropolymer remains in solution and no form gel or solids are formed upon storage at ambient conditions for a time period of at least 2 weeks. In another embodiment the solution has a phase stable shelf-life such that the fluoropolymer remains in solution and no form gel or solids are formed upon storage at ambient conditions for a time period of at least 4 weeks.

The present organic solvent is a material in which the fluoropolymer is soluble and can form a phase stable solution at ambient conditions. In one embodiment the organic solvent has a normal boiling point of at least 50° C. In another embodiment the organic solvent has a normal boiling point of at least 100° C. In another embodiment the organic solvent has a normal boiling point of at least 150° C. In one embodiment the organic solvent is selected from ketones, ethers, esters and halocarbons. In one embodiment, organic solvent can be a ketone solvent, for example, acetone, acetylacetone, methyl ethyl ketone, methyl isobutyl ketone, methyl amyl ketone, 2-pentanone, 3-pentanone, 2-heptanone, 3-heptanone, cyclopentanone, cyclohexanone and the like. In one embodiment, the organic solvent can be an ester solvent, for example, ethyl acetate, propyl acetate, butyl acetate, isobutyl acetate, pentyl acetate, cyclohexyl acetate, heptyl acetate, ethyl propionate, propyl propionate, butyl propionate, isobutyl propionate, propylene glycol monomethyl ether acetate (PGMEA), propylene glycol monoethyl ether acetate, methyl lactate, ethyl lactate, gamma-butyrolactone and the like. In one embodiment, the organic solvent can be an ether solvent, for example, diisopropyl ether, dibutyl ether, ethyl propyl ether, ethylene glycol monobutyl ether and like alkyl ethers of ethylene glycol or propylene glycol, and anisole and the like. In one embodiment, the organic solvent can be an halocarbon, for example chloroform and tetrachloroethylene and the like. In one embodiment, the organic solvent is methyl isobutyl ketone, 2-heptanone, propylene glycol methyl ether acetate or a combination thereof. In one embodiment, the solvent is an unreactive solvent, meaning that the organic solvent does not become a component contained in, or making up, the fluoropolymer coating.

The present fluoropolymer includes repeating units arising from fluoroolefin monomer. Fluoroolefin is at least one monomer selected from the group consisting of tetrafluoroethylene, chlorotrifluoroethylene, hexafluoropropylene, perfluoro(methyl vinyl ether), perfluoro(ethyl vinyl ether), and perfluoro(propyl vinyl ether). In some embodiments, in addition to these fluoroolefins, the fluoropolymer can contain repeat units arising from other fluorinated monomers capable of copolymerizing into the present fluoropolymer, including: trifluoroethylene, vinyl fluoride, vinylidene fluoride, perfluorodimethyldioxole, trifluoropropylene, perfluoro(2-methylene-4-methyl-1,3-dioxolane, hexafluoroisobutylene, methyl 3-[1-[difluoro[(trifluorovinyl)oxy]methyl]-1,2,2,2-tetrafluoroethoxy]-2,2,3,3-tetrafluoropropionate, 2-[1-[difluoro[(1,2,2-trifluoroethenyl)oxy] methyl]-1,2,2,2-tetrafluoroethoxy]-1,1,2,2-tetrafluoro-ethanesulfonyl fluoride, or a combination thereof. In some embodiments, the fluoroolefin monomers forming the fluoropolymer can consist of, or consist essentially of, the aforementioned fluoroolefins.

Fluoroolefin is incorporated into the fluoropolymer in an amount of from 40 to 60 mole percent, based on the total amount of repeating units in the fluoropolymer. In some embodiments, fluoroolefin is incorporated into the fluoropolymer in the range of from 42 to 58 mole percent. In other embodiments, fluoroolefin is incorporated into the fluoropolymer in the range of from 45 to 55 mole percent.

The present fluoropolymer includes repeating units arising from at least one alkyl vinyl ether monomer or aryl vinyl ether monomer. Alkyl vinyl ethers as used herein are those wherein the alkyl group is a C1 to C6 straight chain saturated hydrocarbon radical or a C3 to C6 branched chain or cyclic saturated hydrocarbon radical. Example alkyl vinyl ethers include methyl vinyl ether, ethyl vinyl ether, n-propyl vinyl ether, isopropyl vinyl ether, n-butyl vinyl ether, sec-butyl vinyl ether, t-butyl vinyl ether, n-pentyl vinyl ether, isoamyl vinyl ether, hexyl vinyl ether, and cyclohexyl vinyl ether. In some embodiments, the alkyl vinyl ether consists of or consists essentially of methyl vinyl ether, ethyl vinyl ether, n-propyl vinyl ether, isopropyl vinyl ether or a combination thereof. Aryl vinyl ether as used herein are those wherein the aryl group is unsubstituted (phenyl) or substituted (e.g., alkylphenyl (e.g., tolyl, xylyl, —C$_6$H$_4$(CH$_2$CH$_3$)), halophenyl, aminophenyl). Example aryl vinyl ethers include phenyl vinyl ether.

Alkyl or aryl vinyl ethers are incorporated into the fluoropolymer in an amount of from 40 to 60 mole percent, based on the total amount of repeating units in the fluoropolymer. In some embodiments, alkyl or aryl vinyl ether is incorporated into the fluoropolymer in the range of from 42 to 58 mole percent. In other embodiments alkyl or aryl vinyl ether is incorporated into the fluoropolymer in the range of from 45 to 55 mole percent.

The present fluoropolymer includes repeating units arising from at least one alkenyl silane monomer. Alkenyl silanes as used herein correspond to the general formula SiR1R2R3R4, wherein R1 is an ethylenically unsaturated hydrocarbon radical, R2 is aryl, aryl substituted hydrocarbon radical, branched C3-C6 alkoxy radical, or substituted or unsubstituted cyclic C5-C6 alkoxy radical, and R3 and R4 are independently selected from linear or branched C1-C6 alkoxy radical or substituted or unsubstituted cyclic C5-C6 alkoxy radical.

The alkenyl silane R1 ethylenically unsaturated hydrocarbon radical is an unsaturated hydrocarbon radical capable of productively copolymerizing into the fluoropolymer backbone together with fluoroolefin and alkyl or aryl vinyl ether. In some embodiments the ethylenically unsaturated hydrocarbon radicals are those having from 2 to 5 carbon atoms. In some embodiments the ethylenically unsaturated hydrocarbon radical is ethenyl (vinyl), 2-propenyl (allyl), 1-propenyl, 2-butenyl, 1,3-butadienyl, 2-pentenyl, and the like. In a preferred embodiment the ethylenically unsaturated hydrocarbon radical is ethenyl.

The alkenyl silane R2 radical is aryl, aryl substituted hydrocarbon radical, branched C3-C6 alkoxy radical or substituted or unsubstituted cyclic C5-C6 alkoxy radical. The R2 radical was chosen by the present inventor to be a relatively sterically bulky substituent bonded to the silicon atom of the silane. This was discovered by the present inventor to allow for productive copolymerization and incorporation of the alkenyl silane through the ethylenically unsaturated hydrocarbon radical into the fluoropolymer backbone chain, and also result in the fluoropolymer having phase stable shelf-life such that it remains a dissolved in the organic solvent and does not undesirably form gel at ambient temperatures and without special precautions for at least 3 months (e.g., does not form gel through hydrolysis of the silane alkoxy radicals, followed by silicon-oxygen crosslinking (e.g., —Si—O—Si—)). In one embodiment R2 is aryl, for example phenyl, naphthyl or the like. In another embodiment R2 is an aryl substituted hydrocarbon radical, for example benzyl, —CH$_2$CH$_2$C$_6$H$_5$, or the like. In another embodiment R2 is a branched C3-C6 alkoxy radical. In another embodiment R2 is a substituted or unsubstituted cyclic C5-C6 alkoxy radicals. Example R2 radicals include isopropoxy (—OCH(CH$_3$)CH$_3$, 2-propoxy), isobutoxy (1-methylpropoxy, —OCH(CH$_3$)CH$_2$CH$_3$), secbutoxy (2-methylpropoxy, —OCH$_2$CH(CH$_3$)CH$_3$)), tertbutoxy (2-methyl-2-propoxy, —OC(CH$_3$)$_3$)), and the like. In a preferred embodiment R2 is isopropoxy.

The alkenyl silane R3 and R4 radicals are independently selected from linear or branched C1-C6 alkoxy radicals, or substituted or unsubstituted cyclic C5-C6 alkoxy radicals. In one embodiment, R3 and R4 are identical.

In one embodiment the alkenyl silane is a trialkoxy silane in which the R2, R3, and R4 radicals are identical.

Example alkenyl silanes of the present invention include: vinyltriisopropoxysilane, allyltriisopropoxysilane, butenyltriisopropoxysilane, and vinylphenyldimethoxysilane. In a preferred embodiment, the alkenyl silane monomer of the present invention is vinyltriisopropoxysilane. In some embodiments, the alkenyl silane consists of, or consists essentially of vinyltriisopropoxysilane. Such alkenyl silanes are commercially available, for example from Gelest Inc., Morrisville, Pa., USA.

In one embodiment, the fluoropolymer consists essentially of, or consists of, repeating units arising from the monomers tetrafluoroethylene, methyl vinyl ether and vinyltriisopropoxysilane. In one embodiment, the fluoropolymer consists essentially of, or consists of repeating units arising from the monomers tetrafluoroethylene, ethyl vinyl ether and vinyltriisopropoxysilane.

In accordance with some embodiments, alkenyl silane is incorporated into the fluoropolymer in an amount of from 0.2 to 10 mole percent, based on the total amount of monomers used to form the fluoropolymer. In other embodiments, alkenyl silane is incorporated into the fluoropolymer in an amount of from 1.2 to 8 mole percent, and, in still other embodiments, in the range of from 1.4 to 7 mole percent.

In one embodiment, the fluoropolymer comprises from 40 to 60 mole percent repeat units arising from fluoroolefin, from 40 to 60 mole percent repeat units arising from alkyl vinyl ether or aryl vinyl ether, and from 0.2 to 10 mole percent of repeat units arising from alkenyl silane.

In one embodiment, the fluoropolymer comprises repeat units arising from tetrafluoroethylene, ethyl vinyl ether, and vinyltriisopropoxysilane, the fluoropolymer has a weight average molecular weight of from 50,000 to 330,000 daltons, the solvent is propylene glycol monomethyl ether acetate, and the solution contains from 15 to 25 weight percent of the fluoropolymer. In one embodiment, the fluoropolymer comprises repeat units arising from tetrafluoroethylene, ethyl vinyl ether, and vinyltriisopropoxysilane, the fluoropolymer has a weight average molecular weight of from 120,000 to 330,000 daltons, the solvent is propylene glycol monomethyl ether acetate, and the solution contains from 15 to 25 weight percent of the fluoropolymer. In another embodiment, the fluoropolymer comprises from 40 to 60 mole percent repeat units arising from tetrafluoroethylene, from 40 to 60 mole percent repeat units arising from ethyl vinyl ether, and from 0.2 to 10 mole percent of repeat units arising from vinyltriisopropoxysilane, the fluoropolymer has a weight average molecular weight of from 50,000 to 330,000 daltons, the solvent is propylene glycol monomethyl ether acetate, and the solution contains from 15 to 25 weight percent of the fluoropolymer. In another embodiment, the fluoropolymer comprises from 40 to 60 mole percent repeat units arising from tetrafluoroethylene, from 40 to 60 mole percent repeat units arising from ethyl vinyl ether, and from 0.2 to 10 mole percent of repeat units arising from vinyltriisopropoxysilane, the fluoropolymer has a weight average molecular weight of from 120,000 to 330,000 daltons, the solvent is propylene glycol monomethyl ether acetate, and the solution contains from 15 to 25 weight percent of the fluoropolymer.

In accordance with some embodiments, the fluoropolymer has a weight average molecular weight in the range of from 10,000 to 350,000 daltons. In accordance with some embodiments, the fluoropolymer has a weight average molecular weight in the range of from 100,000 to 350,000 daltons. In other embodiments, fluoropolymer weight average molecular weight can be in a range comprising a minimum weight average molecular weight to a maximum weight average molecular weight wherein the minimum is 10,000, or 20,000, or 30,000, or 40,000, or 50,000, or 60,000, or 70,000, or 80,000, or 90,000, or 100,000, or 110,000, or 120,000, or 125,000, or 130,000, or 140,000, or 150,000, or 160,000 or 170,000 and the maximum is 350,000, or 340,000, or 330,000, or 320,000, or 310,000 or 300,000 daltons. In one embodiment the fluoropolymer has a weight average molecular weight of about 200,000 daltons.

The fluoropolymer can be produced according to known methods. In some embodiments, the monomers can be polymerized without the use of a solvent, and, in other embodiments, the monomers can be polymerized in a solvent, which may or may not be a solvent for the fluoropolymer. In other embodiments, the fluoropolymer can be produced by the emulsion polymerization of the monomers. To produce the desired fluoropolymer, the monomers, at least one free radical initiator and, optionally, an acid acceptor can be charged to an autoclave and heated to a temperature in the range of from 25° C. to about 200° C. for 10 minutes to 24 hours at a pressure in the range of from atmospheric pressure to as high as 1,500 atmospheres. The resulting product can then be removed from the autoclave, filtered, rinsed and dried to give the fluoropolymer.

Suitable free radical initiators used in the polymerization methods to manufacture the fluoropolymer can be any of the known azo and/or peroxide initiators. For example, di(4-t-butylcyclohexyl)dicarbonate, di-t-butyl peroxide, acetyl peroxide, lauroyl peroxide, benzoyl peroxide, 2,2-azodiisobutyronitrile, 2,2-azobis(2,4-dimethyl-4-methoxyvaleronitrile), dimethyl-2,2-azobis(isobutyrate) or a combination thereof can be used. The amount of free radical initiators that can be used range of from 0.05 percent by weight to about 4 percent by weight, based on the total amount of the monomers in the monomer mixture. In other embodiments, the amount of free radical initiators used is in the range of from 0.1 percent by weight to about 3.5 percent by weight, and, in still further embodiments, is in the range of from 0.2 percent by weight to 3.25 percent by weight. All percentages by weight are based on the total amount of the monomers in the monomer mixture.

An acid acceptor can also be used in the polymerization methods to form the fluoropolymer. The acid acceptor can be a metal carbonate or metal oxide, for example, sodium carbonate, calcium carbonate, potassium carbonate, magnesium carbonate, barium oxide, calcium oxide, magnesium oxide or a combination thereof. The acid acceptor can be present in the range of from 0 percent by weight to about 5 percent by weight. In other embodiments, the acid acceptor can be present in the range of from 0.1 percent by weight to 4 percent by weight, and, in still further embodiments, can be present in the range of from 0.2 percent by weight to 3 percent by weight. All percentages by weight are based on the total amount of the monomers in the monomer mixture. The acid acceptor is present in order to neutralize acids, such as hydrogen fluoride that may be present in the fluoroolefin or may be generated during the course of the polymerization.

In one embodiment the present invention is a process for forming a fluoropolymer coating on a substrate, comprising: (I) applying a coating of a solution onto at least a portion of a substrate, wherein said solution comprises i) an organic solvent, and dissolved therein ii) a fluoropolymer comprising repeat units arising from monomers: (a) fluoroolefin selected from the group consisting of tetrafluoroethylene, chlorotrifluoroethylene, hexafluoropropylene, perfluoro(methyl vinyl ether), perfluoro(ethyl vinyl ether), and perfluoro (propyl vinyl ether); (b) alkyl vinyl ether wherein the alkyl group is a C1 to C6 straight chain saturated hydrocarbon radical or a C3 to C6 branched chain or cyclic saturated hydrocarbon radical, or aryl vinyl ether wherein the aryl group is unsubstituted or substituted; and (c) alkenyl silane of the formula SiR1R2R3R4, wherein R1 is an ethylenically unsaturated hydrocarbon radical, R2 is aryl, aryl substituted hydrocarbon radical, branched C3-C6 alkoxy radical, or substituted or unsubstituted cyclic C5-C6 alkoxy radicals, and R3 and R4 are independently selected from linear or branched C1-C6 alkoxy radicals, or substituted or unsubstituted cyclic C5-C6 alkoxy radicals; and (II) removing at least a portion of the organic solvent from the coated solution; and optionally (III) curing the fluoropolymer to form the fluoropolymer coating.

In one embodiment, the present fluoropolymer coating and cured fluoropolymer coating can have a thickness of from 0.025 to 100 micrometers. In another embodiment, the present fluoropolymer coating and cured fluoropolymer coating can have a thickness of from 0.1 to 50 micrometers. In another embodiment, the present fluoropolymer coating and cured fluoropolymer coating can have a thickness of from 0.025 to 0.1 micrometers.

The fluoropolymer coating can be formed on a variety of substrates, including electrically conductive materials, semiconductive materials and/or nonconductive materials. For example, the substrate can be glass, polymeric, inorganic semiconductor, organic semiconductor, tin oxide, zinc oxide, titanium dioxide, silicon dioxide, indium oxide, indium zinc oxide, zinc tin oxide, indium gallium oxide, indium gallium zinc oxide, indium tin zinc oxide, cadmium sulfide, cadmium selenide, silicon nitride, copper, aluminum or a combination thereof.

The present process for forming a fluoropolymer coating on a substrate involves the step of (I) applying a coating of a solution onto at least a portion of a substrate. The application of the coating of the solution of organic solvent and fluoropolymer (fluoropolymer solution) onto at least a portion of the substrate can be carried out by conventional processes, such as by spin coating, spray coating, flow coating, curtain coating, roller coating, brushing, inkjet printing, screen printing, offset printing, gravure printing, flexographic printing, lithographic printing, dip coating, blade coating or drop coating methods. Spin coating involves applying an excess amount of the fluoropolymer solution to the substrate, then rotating the substrate at high speeds to evenly spread and distribute the composition across the surface of the substrate by centrifugal force. The thickness of the resultant fluoropolymer coating can be dependent on the spin coating rate, the concentration of the fluoropolymer solution, as well as the organic solvent used.

The present process for forming a fluoropolymer coating on a substrate involves the step of (II) removing at least a portion of the organic solvent from the coated solution. After application of the fluoropolymer solution to the substrate, at least a portion of, or alternately substantially all of, the organic solvent can be removed by exposing the coating to elevated temperatures, exposure to less than atmospheric pressure, by directly or indirectly blowing gas onto the applied layer or by using a combination of these methods. For example, the applied fluoropolymer coating may be heated in air or in a vacuum oven optionally with a small purge of nitrogen gas. In other embodiments, the coating can be heated to a temperature in the range of from 60 to 110° C. in order to remove the organic solvent.

The present process for forming a fluoropolymer coating on a substrate optionally includes the step of (III) crosslinking the fluoropolymer to form a crosslinked fluoropolymer coating. Crosslinking of the fluoropolymer can be effected by using the silicon of the alkenyl silanes as the crosslinking sites. Conventional crosslinking methods for siloxanes, such as thermal crosslinking or photocrosslinking, can be used to crosslink the fluoropolymer. In one embodiment, fluoropolymer can be considered to be a crosslinkable fluoropolymer, meaning an uncrosslinked fluoropolymer that is capable of being crosslinked. For example, photocrosslinkable fluoropolymer, crosslinked when irradiated with the appropriate wavelength of light in the presence of one or more of a photoacid generator and, optionally, a photosensitizer.

In one embodiment, the step (III) of crosslinking the fluoropolymer to form the fluoropolymer coating comprises photocrosslinking the fluoropolymer to form a photocrosslinked fluoropolymer, wherein the crosslinks within the polymer network are formed as a result of the action of light. In accordance with some embodiments, the solution for forming a fluoropolymer coating comprises i) an organic solvent, and dissolved therein ii) a fluoropolymer comprising repeat units arising from the above specified monomers, iii) a photoacid generator, and optionally iv) a photosensitizer.

Suitable ii) photoacid generators are known in the art and can include, for example, (p-isopropylphenyl)(p-methylphenyl)iodonium tetrakis(pentafluorophenyl)-borate, IRGACURE® GSID-26-1 which is a salt of tris[4-(4-acetylphenyl)sulfanylphenyl] sulfonium and tris(trifluoromethanesulfonyl)methide and is available from BASF, Florham Park, N.J., bis(1,1-dimethylethylphenyl) iodonium salt with tris[(trifluoromethane)sulfonyl]methane also available from BASF, bis(4-decylphenyl)iodonium hexafluoroantimonate oxirane, mono[(C12-C14-alkoxy)methyl] derivatives, available from Momentive as UV9387C, and the like. IRGACURE® GSID-26-1 photoacid generator is especially useful as it does not require the separate addition of a photosensitizer. The photoacid generator can be present in the fluoropolymer coating composition in an amount in the range of from about 0.1 to 10 percent by weight, based on the total amount of the fluoropolymer solid. In other embodiments, the photo acid generator can be present in the range of from 0.1 to 2.0 percent by weight, and, in still further embodiments, can be present in an amount in the range of from 0.1 to 1.5 percent by weight. In still further embodiments, the photoacid generator can be present in the range of from 0.2 to 1.0 percent by weight, based on the total amount of the fluoropolymer coating composition.

The fluoropolymer coating composition can also optionally comprise iii) a photosensitizer. Suitable photosensitizers can include, for example, chrysenes, benzpyrenes, fluoranthrenes, pyrenes, anthracenes, phenanthrenes, xanthones, indanthrenes, thioxanthen-9-ones or a combination thereof. In some embodiments, the photosensitizer can be 2-isopropyl-9H-thioxanthen-9-one, 4-isopropyl-9H-thioxanthen-9-one, 1-chloro-4-propoxythioxanthone, 2-isopropylthioxanthone, phenothiazine or a combination thereof. The optional photosensitizer can be used in the range of from 0 to about 10 percent by weight, the percentage by weight based on the total amount of the fluoropolymer solid. In other embodiments, the photosensitizer can be present in the composition in the range of from 0.1 to 2.0 percent by weight, and, in still further embodiments, in the range of from 0.1 to 1.0 percent by weight. All percentages by weight are based on the total weight of the fluoropolymer coating composition.

EXAMPLES

Source of Chemicals:
 a) PGMEA (1-Methoxy-2-propyl acetate, Lithography Grade, from JT Baker, JTB-6343-05, Center Valley, Pa.)
 b) Vinyl triisopropoxy silane (Gelest Chemicals, SIV9210, Morrisville, Pa.)
 c) 1,1,1,3,3-pentafluorobutane (Alfa Aesar, H33737, Ward Hill, Mass.)
 d) Ethyl vinyl ether (Alfa Aesar, A15691-0F, Ward Hill, Mass.)

e) Potassium carbonate, anhydrous (EMD, PX1390-1, Philadelphia, Pa.)
f) V-601 initiator, dimethyl 2,2'-azobisisobutyrate (Wako Chemicals, Richmond, Va.)

Example 1. Preparation of Poly(Tetrafluoroethene/Ethyl Vinyl Ether/Vinyl Triisopropoxysilane) (Polymer #1)

A 400 ml autoclave chilled to <−20° C. was loaded with 0.5 g of powdered potassium carbonate, 0.24 g V-601 initiator (dimethyl 2,2'-azobisisobutyrate), and 3.8 mL (4.4 g) of vinyl triisopropoxysilane, 36 g (0.5 mole) of ethyl vinyl ether, and 200 mL (250 g) 1,1,1,3,3-pentafluorobutane. The autoclave was evacuated and further loaded with 50 g (0.5 mole) of TFE. The reaction mixture was shaken and heated to 66° C. Pressure in the autoclave peaked at 200 psig, dropping to 76 psig 8 hours later. Upon cooling, a viscous liquid (233.85 g) was obtained. It was transferred to a 1 L Nalgene jar and diluted with 200 g of PGMEA. An additional 70 g of PGMEA was used to dissolve the residue polymer and the resulting solution was also added to the 1 L Nalgene jar. The jar was sealed with tape, and rolled for 2 hours on a roll mill. The polymer solution was transferred to a 2 L round-bottom glass flask, and was vacuumed down to 25 Milibar (19 Torr) to remove volatiles. The resulting solution was passed through 0.2 to 0.45 micron cartridge filter under 20 PSIG air pressure. The filtration went smoothly and efficiently. A polymer solution (397.5 g total, 14.2% solid) was collected in a 0.5 L clean room quality bottle.

Various analyses were run.
Carbon NMR: 49.6 mole % TFE, 49.1 mole % ethyl vinyl ether, and 1.36 mole % vinyl triisopropoxysilane
SEC in hexafluoroisopropanol: Mn=68,140 and Mw=202,220

Example 2. Comparative Example. Preparation of Poly(Tetrafluoroethene/Ethyl Vinyl Ether/Vinyl Triisopropoxysilane) (Polymer #2)

A 400 ml autoclave chilled to <−20° C. was loaded with 0.5 g of powdered potassium carbonate, 0.24 g V-601 initiator (dimethyl 2,2'-azobisisobutyrate), and 3.8 mL (4.4 g) of vinyl triisopropoxysilane, 36 g (0.5 mole) of ethyl vinyl ether, and 100 mL (125 g) 1,1,1,3,3-pentafluorobutane. The autoclave was evacuated and further loaded with 50 g (0.5 mole) of TFE. The reaction mixture was shaken and heated to 66° C. Pressure in the autoclave peaked at 227 psig, dropping to 30 psig 22 hours later. Upon cooling, a gum like material (170.92 g) was obtained. It was transferred to a 0.5 L glass jar, and 295 g of PGMEA was added. The jar was sealed with tape, and rolled for overnight on a roll mill. The polymer solution was transferred to a 2 L round-bottom flask, and was vacuumed down to 4.8 Torr to remove volatiles. The resulting solution was very thick. 50 g of PGMEA was added, and it was rolled on the roll mill for 10 min. It was passed through 0.2 to 0.45 micron cartridge filter under 35 PSIG air pressure. The filtration was difficult, and 4 filter cartridges were used to filter all the material. Polymer solution was collected in 0.5 L clean room quality (particle free) glass bottle. A polymer solution (228.2 g total, 15.5% solid) was collected in a 0.5 L clean room quality bottle.

Various analyses were run:
Carbon NMR: 50.5 mole % TFE, 48.3 mole % ethyl vinyl ether, and 1.20 mole % vinyl triisopropoxysilane.
SEC in hexafluoroisopropanol: Mn=92,450 and Mw=374,480.

What is claimed is:

1. A solution for forming a fluoropolymer coating comprising:
   i) an organic solvent, and dissolved therein
   ii) a fluoropolymer comprising repeat units arising from monomers:
      (a) tetrafluoroethylene;
      (b) alkyl vinyl ether wherein the alkyl group is a C1 to C6 straight chain saturated hydrocarbon radical; and
      (c) alkenyl silane of the formula SiR1R2R3R4, wherein R1 is an ethylenically unsaturated hydrocarbon radical, R2 is a branched C3-C6 alkoxy radical, and R3 and R4 are independently selected from linear or branched C1-C6 alkoxy radical;
   wherein said solution has a phase stable shelf-life such that it remains a liquid and does not gel at ambient temperature for a time period of at least 3 months.

2. The solution of claim 1, wherein said solvent is a ketone, glycol ether or halocarbon having a normal boiling point of at least 50° C.

3. The solution of claim 1, wherein said solvent is at least one of methyl isobutyl ketone, 2-heptanone and propylene glycol monomethyl ether acetate.

4. The solution of claim 1, wherein said solvent is propylene glycol monomethyl ether acetate.

5. The solution of claim 1, wherein in said alkenyl silane is vinyl triisopropoxysilane.

6. The solution of claim 1, containing from 0.5 to 35 weight percent of said fluoropolymer.

7. The solution of claim 1, being substantially free of particles of size greater than 1 micrometers.

8. The solution of claim 1, wherein said fluoropolymer has a weight average molecular weight of from 10,000 to 350,000 daltons.

9. The solution of claim 1, wherein said fluoropolymer comprises from 40 to 60 mole percent repeat units arising from said fluoroolefin, from 40 to 60 mole percent repeat units arising from said alkyl vinyl ether or aryl vinyl ether, and from 0.2 to 10 mole percent of repeat units arising from said alkenyl silane.

10. The solution of claim 1, wherein said fluoropolymer comprises repeat units arising from tetrafluoroethylene, methyl vinyl ether, and vinyl triisopropoxysilane, said fluoropolymer has a weight average molecular weight of from 50,000 to 330,000 daltons, said solvent is propylene glycol monomethyl ether acetate, and said solution contains from 15 to 25 weight percent of said fluoropolymer dissolved therein.

11. The solution of claim 1, wherein the solution additionally comprises photosensitizer and/or photoacid generator.

12. A process for forming a fluoropolymer coating on a substrate, comprising:
   (I) applying a coating of a solution onto at least a portion of a substrate, wherein said solution comprises
      i) an organic solvent, and dissolved therein
      ii) a fluoropolymer comprising repeat units arising from monomers:
         (a) tetrafluoroethylene;
         (b) alkyl vinyl ether wherein the alkyl group is a C1 to C6 straight chain saturated hydrocarbon radical; and (c) alkenyl silane of the formula SiR1R2R3R4, wherein R1 is an ethylenically unsaturated hydrocarbon radical, R2 is a branched C3-C6 alkoxy radical, and R3 and R4 are independently selected from linear or branched C1-C6 alkoxy radicals;

and wherein said solution has a phase stable shelf-life such that it remains a liquid and does not gel at ambient temperature for a time period of at least 3 months;

(II) removing at least a portion of said organic solvent from the coated solution, thereby forming said fluoropolymer coating.

13. The process of claim 12, further comprising (III) curing said fluoropolymer after said step (II) removing at least a portion of said organic solvent from the coated solution.

14. The process of claim 13, wherein said fluoropolymer coating has a thickness of from 0.025 to 100 micrometers.

* * * * *